United States Patent [19]

Bohannon

[11] 4,421,829
[45] Dec. 20, 1983

[54] HYDROGEN AZIDE-OXYGEN FUEL CELL

[76] Inventor: Robert C. Bohannon, 3392 W. Aksarben Ave., Littleton, Colo. 80123

[21] Appl. No.: 404,141

[22] Filed: Aug. 2, 1982

[51] Int. Cl.$^3$ .............................................. H01M 8/22
[52] U.S. Cl. ........................................ 429/15; 429/17
[58] Field of Search ....................... 429/17, 15, 12, 13

[56] References Cited

U.S. PATENT DOCUMENTS

| | | | |
|---|---|---|---|
| 3,595,698 | 7/1971 | Kordesch | 429/12 |
| 4,001,040 | 1/1977 | Fukuda et al. | 429/15 |

*Primary Examiner*—Donald L. Walton

[57] ABSTRACT

A powerful hydrogen azide-oxygen fuel cell can be obtained by passing an aqueous solution of Hydrogen Azide (not to exceed 30% by weight) and Sodium Sulphate over a platinized electrode which forms the anode (−) of the fuel cell. Oxidation takes place at the cathode (+) by the introduction of Oxygen over a platinized electrode.

The azide ($N_3$) radical looses electrons and forms gaseous nitrogen while the oxygen atom picks up the electrons, in the presence of platinum, and forms water with the surplus hydrogen atoms ($H^+$) present. The measured cell voltage is 5 volts.

1 Claim, 1 Drawing Figure

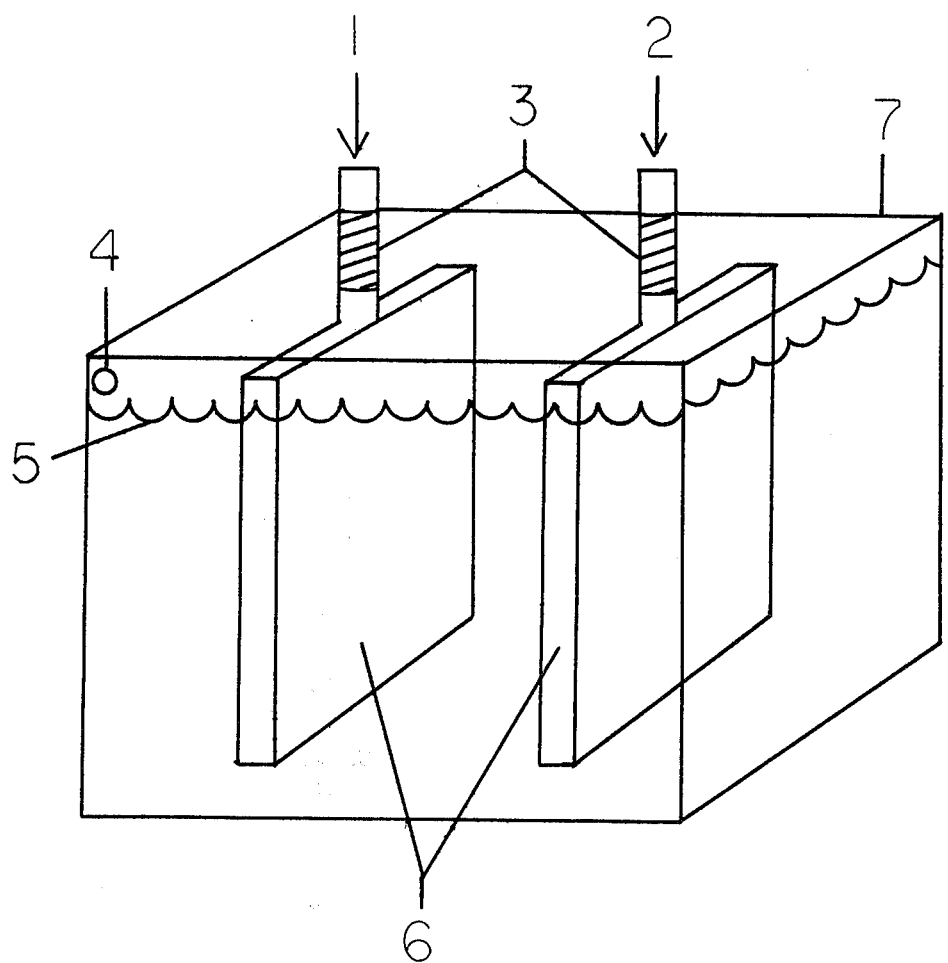

HYDROGEN AZIDE-OXYGEN FUEL CELL

SUMMARY OF INVENTION

The object of the HYDROGEN AZIDE-OXYGEN FUEL CELL, hereinafter referred to as FUEL CELL, is to generate electrical power by the reduction and oxidation of an Hydrogen Azide (also known as Hydrozoic acid) solution with Oxygen in the presence of a Platinum catalyst. The resulting chemical reactions produces a powerful electric current for applications such as: providing power for electric cars, space vehicles, homes, etc.

DESCRIPTION OF DRAWING

The constituents shown in the drawing are:
1—Hydrogen Azide solution input
2—Oxygen (or air) input
3—Electrical connection posts
4—Gas/Solution vent
5—Electrolyte solution
6—Porous carbon (or graphite) electrodes impregnated with Platinum
7—Cell housing assembly The drawing shown is a three dimensional drawing which depicts the front, top, and right side of the Fuel Cell as well as the internal components as viewed through a transparent Cell Housing Assembly.

DETAILED DESCRIPTION

An aqueous solution of Hydrogen Azide and Sodium Sulphate (electrolyte constituate), (1), is prepared by the addition of dilute Sulphuric Acid ($H_2SO_4$) to a solution of Sodium Azide ($NaN_3$):

$$2H_2SO_4 + 4NaN_3 = 4HN_3 + 2NaSO_4 \text{ (aqueous)}$$

For example: 0.2 moles of Sodium Azide are dissolved in 500 milliliters of water and is mixed with 500 milliliters of 0.1 molar Sulphuric Acid. It should be noted that pure Hydrogen Azide is extremely explosive and that a prepared solution should not contain more than 30% by weight of Hydrogen Azide.

Porous carbon or graphite electrodes can be purchased through chemical supply houses or may be formed by either drilling out blocks of carbon or by compression of powered carbon at high temperature and pressure. Platinum metal acts as a catalyst and is electrolytically plated onto the outer surface of the electrodes from a solution of Chloroplatinic Acid or Platinum Potassium Chloride until a very slight metal coating is observed. Electrical connections (3) to the electrodes should be incorporated in the form of the electrodes or metal clamps can be mounted on the electrodes to serve as electrical connections. In forming the electrodes (6), piping for the solution of Hydrogen Azide (1) and oxygen (2) should be incorporated to allow the reactants to enter the inner portion of the electrodes which was drilled out. This is done during the formation of custom electrodes (6) or by glueing appropriate fittings on the top of the cavity drilled out. It should be noted that other electrode materials can be used such as titanium, tantalum, and palladium sponge which is impregnated with Platinum, however, the costs are considerable.

The electrodes are not placed into the Cell Housing Assembly (7) and a 0.2 molar solution of Sodium Sulphate (5) is added to a level just below the Gas/Solution Vent (4) on the side of the Cell Housing Assembly (7). The electrodes and top of the Cell Housing Assembly are then epoxied or fastened into place. The Cell Housing Assembly (7) may be made out of just about any plastic material such as polyethylene but not from metal as a metal azide will form which is extremely explosive.

The Fuel Cell operates when the solution of Hydrogen Azide (1) and gaseous oxygen or air (2) is pumped through the electrodes according to the following reactions:

| | |
|---|---|
| $4HN_3 = 4H^+ + 4N_3^-$ | (aqueous) |
| $4N_3^- = 6N_2 + 4e^-$ | (in presence of Platinum catalyst) |
| $O_2 + 4e^- = 2O^{-2}$ | (in presence of Platinum catalyst) |
| $4H^+ + 2O^{-2} = 2H_2O$ | |
| Overall: $4HN_3 + O_2 = 2H_2O + 6N_2$ | (5 volt EMF) |

Upon demand, an aqueous solution of Hydrogen Azide (1) and the electrolyte, Sodium Sulphate, are carefully pumped through the electrode (6) while Oxygen or purified air (2) is pumped through the other electrode (6). A cylinder of compressed air or oxygen can be used to pump the reactants however, there is a partial loss of power is used to pump the Hydrogen Azide solution (1).

The electrolyte solution (5) is constantly renewed when the Fuel Cell is operated as the Hydrogen Azide solution (1) contains the electrolyte. As the cell fills up and nitrogen is released, the Gas/Solution Vent (4) allows the spent by products to pass out of the cell, preferably into a holding tank. A finished Fuel Cell System can be charged by supplying additional Hydrogen Azide solution (1) and by draining the holding tank simultaneously, assuming an air mixture is used as a source of oxygen.

The Fuel Cell power output varies according to the size of the electrodes, rate of Hydrogen Azide solution and Oxygen injection, temperature, and construction techniques. However, the voltage can be maintained at 5 Volts at room temperature but can theoretically be increased somewhat by optimizing the quality of the Fuel Cell components.

I claim:
1. A method of operation of a fuel cell comprising a cell housing, a catalytic fuel electrode, a catalytic oxidant electrode and an electrolyte, said method comprising supplying an electrolyte solution containing hydrogen azide to said fuel electrode and an oxygen containing gas to said oxidant electrode.

* * * * *

UNITED STATES PATENT AND TRADEMARK OFFICE
CERTIFICATE OF CORRECTION

PATENT NO. : 4,421,829

DATED : December 20, 1983

INVENTOR(S) : Robert C. Bohannon

It is certified that error appears in the above-identified patent and that said Letters Patent is hereby corrected as shown below:

Column 2, line 6, "not" should read -- now --.
Column 2, line 34, "is" should read -- if --.

Signed and Sealed this

Fifteenth Day of May 1984

[SEAL]

Attest:

GERALD J. MOSSINGHOFF

Attesting Officer

Commissioner of Patents and Trademarks